United States Patent

NG et al.

[11] Patent Number: 5,952,786
[45] Date of Patent: Sep. 14, 1999

[54] AUTO DEGUASSING FROM STAND-BY TO ON

[75] Inventors: Seng Huat NG; Chun-Hsing Wu, both of Singapore, Singapore

[73] Assignee: Thomson multimedia S.A., Boulogne Cedex, France

[21] Appl. No.: 09/062,331

[22] Filed: Apr. 17, 1998

[30] Foreign Application Priority Data

Apr. 24, 1997 [GB] United Kingdom ............. 9708262

[51] Int. Cl.⁶ ................................. H01J 29/06
[52] U.S. Cl. ....................... 315/8; 315/85; 348/820; 361/150
[58] Field of Search ............... 315/8, 85; 348/819, 348/820; 361/139, 149, 150

[56] References Cited

U.S. PATENT DOCUMENTS

| 4,441,052 | 4/1984 | Willis | 315/8 |
| 5,170,096 | 12/1992 | Kang et al. | 315/8 |

FOREIGN PATENT DOCUMENTS

| 2181328 | 4/1987 | European Pat. Off. . |
| 0274854 | 7/1988 | European Pat. Off. . |
| 2080077 | 1/1982 | United Kingdom . |

OTHER PUBLICATIONS

Copy of Search Report.

*Primary Examiner*—Robert Pascal
*Assistant Examiner*—Michael B. Shingleton
*Attorney, Agent, or Firm*—Joseph S. Tripoli; Frederick A. Wein; Daniel E. Sragow

[57] ABSTRACT

Circuitry to control a power supply of a degaussing coil of a cathode ray tube, said degaussing coil is coupled to a main voltage supply through a switching device the circuitry has inputs coupled to a direct source of current of a switched mode power supply, the switched mode power supply comprises a switched mode transformer with primary windings coupled to the main source of voltage, and secondary windings and the switched mode power supply is switched in a first range of frequencies when the power supply is in a "standby" mode and in a second range of frequencies when the power supply is in an "on" mode wherein said circuitry comprising a detecting circuit which detectes a change in the range of switching frequencies when the power supply is switched from standby to on, the detecting circuit having an input coupled to a direct current source being downstream of a primary winding of the switched mode transformer and an output coupled to an input of a control circuit of the switching device the control circuit, having an output to carry an output signal having an "on" state and an "off" state, the "on" state lasting for a predetermined duration after a change in a value present at the output of said detection circuit, the change occurring when the power supply is switched to the "on" mode, in the "on" state of said signal at the output of said control circuit, the switching device is on and current coming from the main is flows through the degaussing coil and in the "off" state of said signal the switching device is off and no current is circulates in the degaussing coil.

8 Claims, 2 Drawing Sheets

AUTO DEGAUSSING FROM STAND-BY TO ON

FIELD OF THE INVENTION

The invention relates to the field of circuitry in particular that are used to supply autodegaussing coils of a cathode ray tube (CRT). CRT are mainly used in television and monitor sets.

BACKGROUND OF THE INVENTION

Every CRT is provided with a degaussing coil, which is a coil fixed on the CRT. A supply circuit for this coil supplies a current in the coil each time the CRT is switched on. An alternative decreasing current is supplied in the degaussing coil that produces a magnetic field whose field vector changes direction with the sign of the current. The purpose of said current is to get rid of all remnant magnetic field that may still exist inside the tube. Such remnant magnetic field would produce an unwanted deflection of the electron beam of the CRT. The magnetic field produced by the alternative current degausses the magnetic material around and inside the tube, so that no more magnetic fields from magnetic material are present in the vicinity of the tube.

KNOWN PRIOR ART

A known prior art circuit is shown on FIG. 1, which comprises a self oscillating circuit 1. Circuit 1 comprises, connected in parallel, the degaussing coil 2, a capacitor 3 and posistor 4, (temperature positive coefficient resistor). Circuit 1 is connected to main supply by a relay 5. Relay 5 comprises a contact 6 and a control coil 7. Control coil 7 is in a known way supplied by the secondary of a fly back transformer of a switched mode power supply. The supply of coil 7 is made by a direct current, which when passing through coil 7 closes contact 6. On FIG. 1 we have represented this current as being supplied by a 13 volts direct voltage source. Supply of coil 7 is under control of a circuit 20. Circuit 20 is such that coil 7 is fed only for a short while after the set is turned on. Circuit 20 is connected to first 8 and second 9 connection of coil 7 in the following known way. First connection 8 of coil 7 is connected in a serial way with a PNP transistor 10 whose base 11 is connected to the anode 12 of a diode 13 whose cathode 14 is connected to a first connection of a resistor R1 15. The second connection of R1 15 is in contact with connection 9 of coil 7. Connection 9 also receives the 13 volts from the direct supply source. The connection common to cathode 14 of diode 13 and to the first connection of resistor 15 is also connected to an end of a capacitor C1 16. The function of circuit 20 is fulfilled as follow. When the switched mode power supply of the apparatus is turned on, capacitor C1 16 is empty. The 13 volts coming from the secondary of the power supply, applied to the emitter of PNP transistor 10 will fire transistor 10 on. A current is flowing through coil 7 of relay 5 and emitter 17, collector 18, path of transistor 10. In the parallel circuit of R1, C1 a current is also flowing that charge capacitor C1. When C1 charges, the voltage at the base 11 of transistor 10 also increases and arrive up to a point where voltage between emitter 17 and base 11 of transistor 10 is too low to maintain said transistor 10 open. At this point no current is anymore circulating in coil 7, and contact 6 of the relay 5 opens. No more current is then circulating in the degaussing coil 2. The duration of the current in coil 2 depends on the value of R1 15 and C1 16.

Although this circuit works generally well, the inventors have discovered that from time to time for an apparatus giving good results, it could happen that degaussing was unproperly done. In such case the quality of the image displayed by the tube is altered. The inventors noticed this phenomenon while working on a new development for a chassis of a TV apparatus. They often had to switch from stand-by to on using a remote control. After investigation it was found that when the 13 volts is being supplied to the degaussing circuit, a vertical deflection circuit is at the same moment supplied by a 24 volts output coming from an other secondary winding of the fly back transformer. This causes a vertical deflection yoke of the tube to be fed and this yoke produces a magnetic field. Because of the simultaneity or partial simultaneity of magnetic fields produced by the degaussing coil and the deflection yoke the total effect of degaussing action of the tube is incomplete.

The purpose of the invention is to realise a circuit fed from a direct source of current coming from a primary side of the power supply of the set, to command current of main voltage to flow through the degaussing coil, that will ensure in a more reliable way that degaussing is properly over and well done when the vertical deflection coil of the tube is starting to be power supplied. In a preferred embodiment the circuit according to the invention is used with a self oscillating power supply circuit. The operating frequency of such power supply is dependant upon the loads of the power supply and upon the value of the main voltage. In this case when the power supply is in normal operation that means when the apparatus is in "on" mode it is designed to operate in higher frequency than when in "standby" mode. The inventors have taken advantage of this feature and use it to provide biasing voltages to their circuit. This circuit will operate well independently of the operating mains and of the load of the power supply. Another advantage of the invention is that when the switching mean is the usual relay, the relay which operates the degaussing circuit is fed completely by the hot side, that is to say the main, primary side of the switching mode transformer. Therefore, the degaussing coil is supplied independently of the deflection yokes and is operated before the deflection yokes are active. An other advantage coming from the relay being completely on the hot side is that the insulation characteristics of the relay may be weaker, thus decreasing the cost of the relay.

To all those ends the invention relates to a circuitry a circuitry to control a power supply of a degaussing coil of a cathode ray tube, said degaussing coil being coupled to a main voltage supply, said circuitry having an input coupled to a direct source of current of a switched mode power supply, said switched mode power supply comprising a switched mode transformer with primary windings coupled to the main source of voltage, and secondary windings said switched mode power supply being switched in a first range of frequencies when the power supply is in a standby mode and in a second range of frequencies when the power supply is in an "on" mode wherein said circuitry comprises a detecting circuit said detecting circuit detecting a change in the range of switching frequencies when the power supply is switched from standby to on, said detecting circuit having an input coupled to a direct current source being downstream of a primary winding of the switched mode transformer and an output coupled to an input of a control circuit of a switching device, said control circuit having an output to carry an output signal having an "on" state and an "off" state, the "on" state lasting for a predetermined duration after a change in a value present at the output of said detection circuit, said change occurring when the power supply is switched to the on mode, in the "on" state of the signal at the output of the control circuit, current coming from the main is flooding in the degaussing coil and in the "off" state of said signal, no current is circulating in the degaussing coil.

BRIEF DESCRIPTION OF THE DRAWINGS

A detailed description of a preferred embodiment of the invention is here below given in relation with the appended drawings in which.

DESCRIPTION OF A PREFERRED EMBODIMENT

Figure 1:
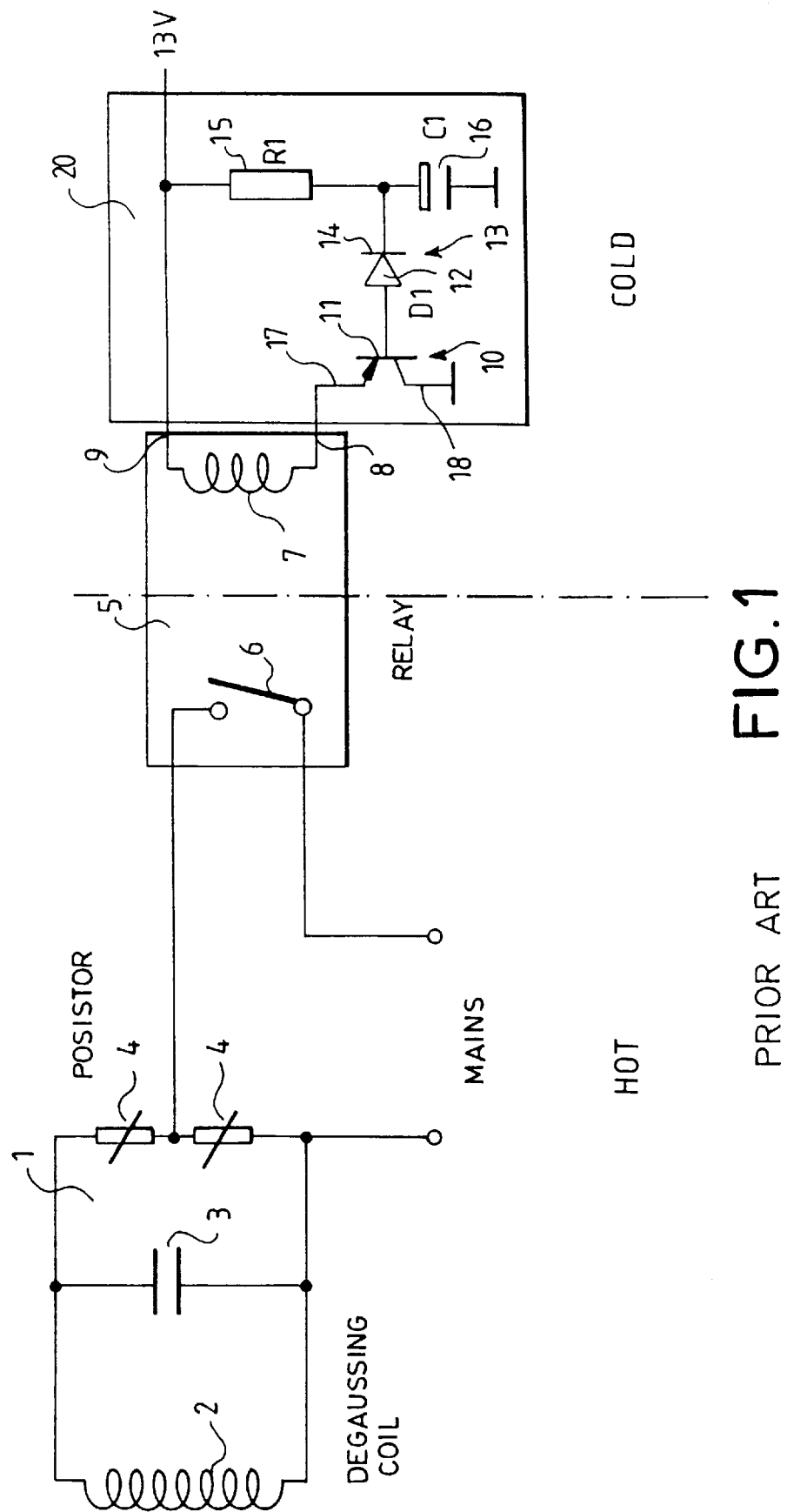
FIG. 1 already commented is a schematic diagram of a known prior art circuit of a degaussing coil.
Figure 2:
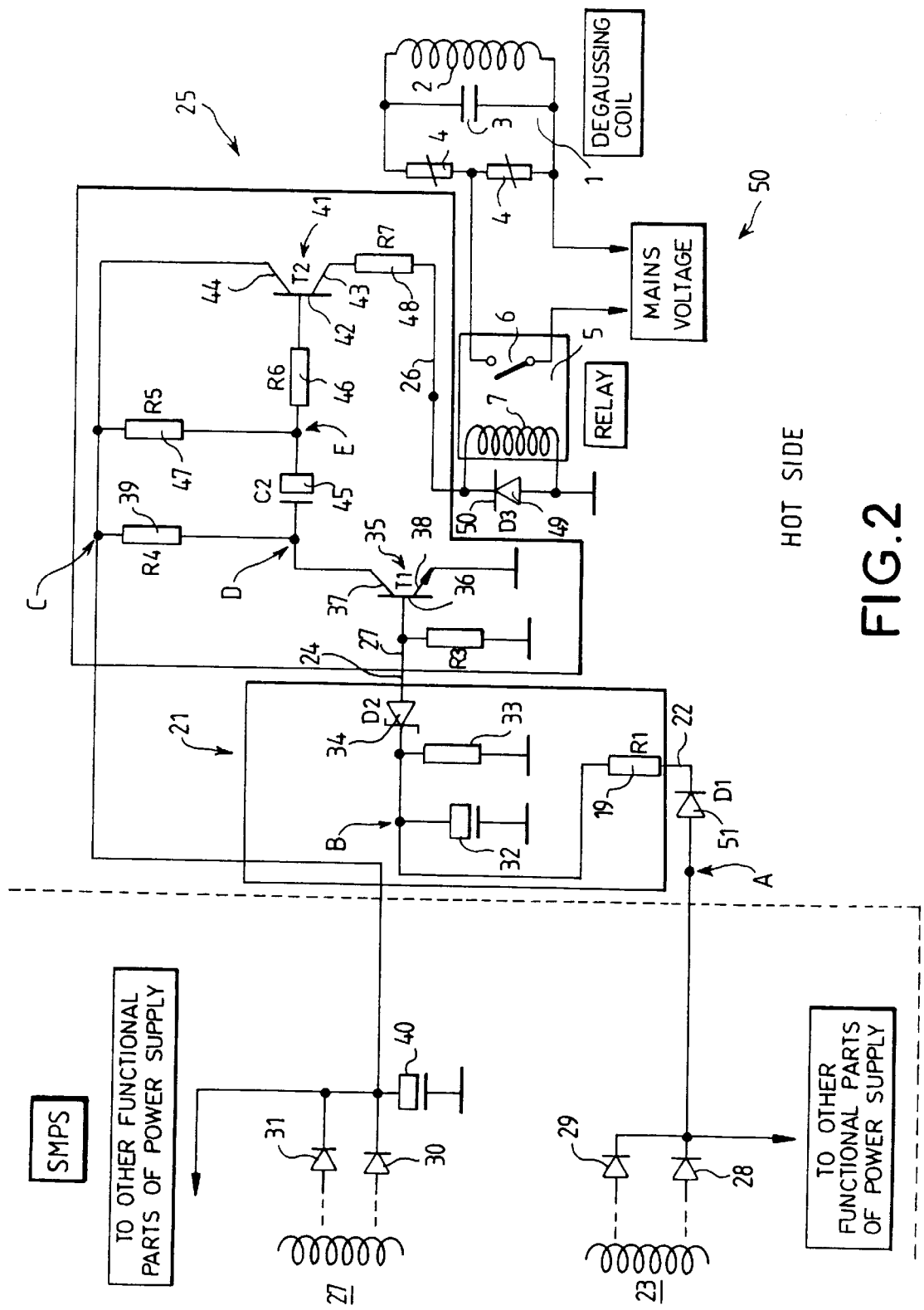
FIG. 2 is a schematic diagram of a preferred embodiment of the invention.

In FIG. 2 which is now described, components having the same function than the ones represented in FIG. 1 are given the same reference number. FIG. 2 represents a diagram of a preferred embodiment of a circuit 50 according to the invention. FIG. 2 is partitioned in two parts by a vertical doted line. The part of the left hand side of the figure is a symbolic representation of outputs of primary windings 23 and 27 of a switched mode transformer, said transformer being a component of a switched mode power supply (SMPS) which is known per se. The left side of the figure is represented so that it can be understood how the circuit according to the invention is connected. Diodes 28–31 linked by doted lines to windings 23, 27 are there to indicate that current feeding input 22 of detecting circuit 21 is a direct current coming from primary side of the power supply. Detecting circuit 21 comprises connected to a common point B a capacitor 32 in parallel with resistors 19, 33. A zener diode 34 is coupled between point B and the output 24 of detecting circuit 21. The functioning of this circuit is as follow. The time constant of R,C circuit 32, 33 is such that when pulses coming at input 22 of detecting circuit 21 is low, the charge accumulated in this capacitor during the high time of input 22 is discharged through resistor 33 during the low time of said input 22. When the frequency of the pulses coming from the power supply increases, which is the case when the set, for instance a television set is switched from stand by to on, capacitor 32 is not given time enough to fully discharge between two pulses. So that in this case voltage at point B increases up to the breakdown voltage of zener diode 34. A positive voltage is then present at the output 24 of detecting circuit 21, showing that the set has been turned on. The value of the time constant is determined so that the set needs to be on for a minimum time in order to avoid that spurious pulses are mistaken with a transition of the set to on. The output 24 of detecting circuit 21 is coupled with input 27 of a control circuit 25 of a switching device 5. Switching device 5 is in this preferred embodiment a relay having a coil 7 and a contact 6. Input 27 of control circuit 25 is coupled to the base 36 of an NPN transistor 35. The collector 37 of transistor 35 is connected to a point C through a resistor 39. The emitter 38 of said transistor is coupled to a constant voltage which, in this case is ground. Point C is coupled to a direct voltage source coming from a primary winding 27 of the power supply of the set. A large capacitor 40 has an end connected to ground and another end common to the output of diodes 30, 31 and point C. Said capacitor 40 is used as a reservoir between diodes 30, 31 and point C and other functional parts of the power supply of the set. The level of voltage at point C is dependent upon the frequency of pulses produced in a known way by the switching device of the power supply, (SMPS). Collector 37 of transistor 35 is coupled to the base 42 of a PNP transistor 41 through a capacitor 45 and a resistor 46. A point E common to an end of capacitor 45 and an end of resistor 46 is linked through a resistor 47 to point C and to the emitter 44 of transistor 41. The collector 43 of said transistor 41 is linked to an end of coil 7 of relay 5 and to the cathode 50 of a diode 49 whose anode is connected to the other end of coil 7. Degaussing circuit 1 is coupled to main through contact 6 of said relay 5. Circuit 50 functions as follow:

When TV is switched from stand-by mode to on mode, the frequency of the SMPS is increased compared to stand-by state. This causes, as explained above, the rectified voltage at point B, to be at around 8 V. Thus, this will breakdown the zener diode 34, (a value of 6.2 V). At this instant, transistor 35, which is a NPN transistor will be turned on. Point D common to collector 37 of transistor 35 and an end of capacitor 45, will be pulled to ground. A possible charge of capacitor 45 is discharged through transistor 35. Voltage at the base 42 of transistor 41 is low, so that emitter base voltage of transistor 41 is sufficient to fire on transistor 41. Capacitor 45 at a stage, which is uncharged, will be charged to potential of point C through transistor 41, which is a PNP transistor. The time constant of the charging up of capacitor 45 is controlled by resistor 46. At the time when transistor 41 is on, besides charging up capacitor 45, current is also flowing to the coil 7 of the relay 5. The relay 5 is energized and the contact 6 of relay 5 is closed to provide a path for the current of the main to flow to the degaussing coil 2, thus, degaussing the picture tube. After capacitor 45 has been slowly charged up to the potential of point C, the transistor 41 will be cut off. The relay coil 7, which has no more current flowing through it, will open the contact 6. This will disconnect the main voltage from the degaussing coil. Thus, allowing the posistor 4 to cool down and making degaussing action possible when the set is switched from stand-by to on mode again. The time constant of capacitor 45 charging up is determined by the timing in which the picture tube is to be completely degaussed. This is usually to be after 5 seconds. In our case, the duration is fixed at around 7 seconds. When the TV set is switched from on mode to stand-by mode by remote control, the SMPS switching frequency decreases. Therefore, the rectified voltage at point B decreases to a value (around 5 V) that will not breakdown the zener diode 34, 6.2 V. The NPN transistor 35 will then be cut off. This will cause the potential at point E to be higher than point C, thereby discharging the capacitor 45 through resistor 47 and resistor 39 connected between point D and point C, till potential at point C is reached. The voltage at point C remains constant during the operating frequency of the SMPS at stand-by and on mode of the TV due to the value of capacitor 40, which as explained above, is large enough. Diode 49 acts as a comutating diode for the coil 7 of relay 5. A diode 51 between diode 28, 29 of the SMPS and circuit 50, isolates circuit 50 from the power supply so as not to affect the functional aspect of the SMPS by said circuit. Values of resistors 19, 33 and of capacitor 32 determine the voltage that will be used to turn on transistor 35. It may be seen from this functioning that circuit comprising transistor 41, resistor 46 and capacitor 45 acts as a kind of automatic time switch, the time on being determined by the R,C time constant of resistor 46 and capacitor 45, said automatic time switch being triggered and settled to initial condition by circuit comprising transistor 35. Said transistor 35 is itself settled to on or off according to the value present at the output 24 of detecting circuit 21.

We claim:

1. Circuitry to control a power supply of a degaussing coil of a cathode ray tube, said degaussing coil being coupled to a main voltage supply through a switching devices, said circuitry having inputs coupled to a direct source of current of a switched mode power supply, said switched mode power supply comprising a switched mode transformer with primary windings coupled to the main source of voltage, and secondary windings, said switched mode power supply being switched in a first range of frequencies when the power supply is in a "standby" mode and in a second range of frequencies when the power supply is in an "on" mode, wherein said circuitry comprises a detecting circuit, said detecting circuit detecting a change in the range of switching frequencies when the power supply is switched from standby to on, said detecting circuit having an input coupled to a direct current source being downstream of a primary winding of the switched mode transformer and an output coupled to an input of a control circuit of the switching device, said control circuit having an output to carry an output signal having an "on" state and an "off" state, the "on" state lasting for a predetermined duration after a change in a value present at the output of said detection circuit, said change occurring when the power supply is switched to the "on" mode, in the "on" state of said signal at the output of said control circuit, the switching device is on and current coming from the main is flooding in the degaussing coil and in the "off" state of said signal the switching device is off and no current is circulating in the degaussing coil.

2. Circuitry according to claim 1, wherein said detecting circuit comprises a capacitor coupled to the input of said detecting circuit, said capacitor being charged by pulses coming from a primary winding, said capacitor being coupled to an end of a zener diode, the other end of said diode being coupled to the output of said detecting circuit.

3. Circuitry according to claim 1, wherein said control circuit comprises two transistors, a first and a second, the first one being triggered on or off according to the value present at the output of detecting circuit, firing on of said first transistor and firing on said second transistor, said second transistor having biasing means including a capacitor which begins to be charged when said second transistor is fired on, the charge duration of said capacitor determining an on duration of said second transistor, the on duration of said second transistor being the "on" state of said control circuit.

4. Circuitry according to claim 1 wherein said switching device is a relay having a control coil and a contact, said control coil being coupled to an electrode of said second transistor, said contact controlling flowing of a current in the degaussing coil.

5. Circuitry according to one of claims 3 or 4 wherein said first transistor has a base and two other electrodes, a collector and an emitter, wherein said second transistor has a base and two other electrodes, a collector and an emitter, said base of first transistor being coupled to the output of said detecting circuit, an other electrode of said first transistor being coupled to the base of said second transistor through a capacitor-resistor path, said resistor and capacitor being the biasing means of said second transistor.

6. Circuitry according to claim 5 wherein said first transistor is an NPN transistor having its emitter coupled to a constant reference voltage, and its collector coupled to the base of said second transistor, said second transistor being a PNP transistor having its collector coupled to said control coil of said relay.

7. Circuitry according to claim 6 wherein said emitter of said second transistor is coupled to a direct source of voltage, said source being a rectified voltage coming from a primary winding of the switched mode transformer.

8. Circuitry according to claim 7 wherein each end of said biasing capacitors of said second transistor is coupled to the same source of voltage as said emitter of said second transistor through a resistor.

\* \* \* \* \*